United States Patent Office 3,221,056
Patented Nov. 30, 1965

3,221,056
PREPARATION OF MERCAPTANS AND
THIO-ETHER COMPOUNDS
Rector P. Louthan, Bartlesville, Okla., assignor to Phillips
Petroleum Company, a corporation of Delaware
No Drawing. Filed Dec. 26, 1962, Ser. No. 247,343
6 Claims. (Cl. 260—583)

This invention relates to the preparation of organic sulfur compounds. In another aspect, it relates to an improved process for preparing organic sulfur compounds, namely mercaptans and/or thio-ethers.

Organic sulfur compounds are of considerable industrial importance and processes for obtaining them in high yields by reaction of hydrogen sulfide with ethylenically unsaturated compounds are of considerable utility.

I have now discovered that organic sulfur compounds, namely mercaptans and/or thio-ethers (sulfides) can be readily prepared in high yields by reacting hydrogen sulfide with organic compounds containing ethylenic unsaturation in the presence of catalytic amounts of sulfur and certain basic compounds.

The ethylenically unsaturated compounds used in this invention to react with hydrogen sulfide can be represented by the following general formula:

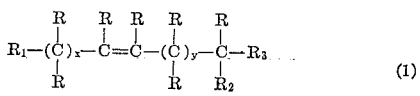

where:

$x$ is an integer from 0 to 5,
$y$ is an integer from 0 to 5,
R is selected from the group consisting of hydrogen and alkyl radicals preferably having 1 to 5 carbon atoms,
$R_1$ and $R_2$ are selected from the group consisting of hydrogen and alkyl radicals preferably having 1 to 5 carbon atoms, and together can form a covalent bond with the proviso that when they form said covalent bond that the sum of $x$ and $y$ is at least 2, and
$R_3$ is selected from the group consisting of hydrogen, alkyl radicals preferably having 1 to 5 carbon atoms, $N(R)_2$ and OR where R is as defined above.

Representative ethylenically unsaturated compounds coming within the scope of Formula 1 and useful in the practice of this invention include propylene, 1-butene, 2-butene, 2-pentene, 2-hexene, 1-octene, 4-hendecene, 9-eicosene, 3-methyl-2-hexene, 3,5,7-trimethyl-4-decene, 6-n-butyl-4-hexadecene, cyclopentene, cyclohexene, cyclooctene, cyclodecene, cyclohendecene, 4-n-butylcyclohexene, allylamine, N-methyl allylamine, N,N-dimethyl allylamine, N,N-di-n-pentyl allylamine, 4-methyl-4-pentenylamine, N-ethyl(1-ethylallyl)amine, N,N-di-n-propyl allylamine, N - isopropyl(2-isopropyl-3-butenyl)amine, 1, 1,2,2-tetraethyl-3-butenylamine, N-n-pentyl,N-n-butyl-4-hendecenylamine, 3-cyclohexenylamine, 3,6-dimethyl-5-aminocyclooctene, N,N-di-n-butyl- 4-n-pentyl-3-amino-cyclohexane, allylalcohol, methallyl alcohol, 2-methyl-3-hexenyl alcohol, 2-decenyl alcohol, 4-hendecenyl alcohol, 3-hydroxycyclohexene, 5-hydroxycyclooctene, 3-methoxy-propene, 4-n-pentoxy-1-butene, 1-ethoxy-2-butene, 11-isopropoxy-4-hendecene, 3-methoxycyclopentene, 3-n-butyl-9-n-pentoxycyclohendecene, 4-n-butoxcyclohexene, and the like, including mixtures of such compounds. The total number of carbon atoms in these ethylenically unsaturated compounds can vary, but generally will not exceed 20.

As mentioned hereinbefore, the reaction between the ethylenically unsaturated compound with hydrogen sulfide is carried out in the presence of sulfur and certain basic compounds. The amount of the sulfur catalyst used in this invention is, stated functionally, a catalytic amount, i.e., an amount sufficient to catalyze the reaction and increase the yield of organic sulfur compounds. Generally, for most preparations of the organic sulfur compounds the amount of such catalyst will be usually within the range of 0.2 to 5 grams per mole, perferably 0.5 to 2 grams per mole, of the ethylenically unsaturated compound charged to the reaction zone.

It is also necessary in this invention to carry out the reaction in the presence of a basic compound which has a catalytic effect, in addition to the sulfur. These basic compounds representatively include ammonia, and primary, secondary or tertiary amines. Such basic compounds can be represented by the general formula $N(R_4)_3$ where $R_4$ is hydrogen or an alkyl radical preferably having 1 to 8 carbon atoms. Representative amines useful as basic catalysts in this invention include methylamine, dimethylamine, trimethylamine, ethylamine, diethylamine, triethylamine, di-n-butylamine, tri-n-butylamine, tri-sec-hexylamine, tri-n-octylamine, and the like, including mixtures of such amines. In addition, alkali metal hydroxides can be used as such basic compounds, including the hydroxides of sodium, potassium, lithium, rubidium, and cesium. Where such basic catalyst is employed, the amount thereof, stated functionally, to be used in this invention is also a catalytic amount; generally the amount will be in the range from 0.25 to 30 grams per mole, preferably 1 to 10 grams per mole, of the ethylenically unsaturated compound. It should be understood, however, that the use of such basic compound is not essential where $R_3$ in Formula 1 is said $N(R)_2$, in which case ethylenically unsaturated compound can function as the basic catalyst as well as the reactant.

The improved reaction of this invention can be carried out in a manipulative manner like that of the prior art, and can be effected in a batch, intermittent, or continuous manner. The reaction temperature can vary over a wide range, and generally will be in the range of 25 to 150° C., preferably from 50 to 100° C. The amount of hydrogen sulfide used can vary widely, but generally will be in the range from 1 to 10 moles per mole, preferably 1 to 3 moles per mole, of the unsaturated compound. The reaction can be carried out in a closed system and the pressure in the reaction zone generally will be the autogenous pressure developed at the specified temperature, such pressures generally being in the range from 100 to 1,000 p.s.i. The reaction time can also vary; generally the reaction time will be in the range between 0.5 and 20 hours, preferably 1 to 5 hours, although the reaction time can be outside of these ranges.

After reaction is completed to the desired degree, the product of reaction can be recovered by well known procedures. For example, gases can be vented, recovered and recycled, if desired, and the product fractionated, distilled, crystallized or subjected to various other separation and recovery procedures to obtain the desired sulfur compounds. These sulfur compounds will be secondary mercaptans and/or thio-ethers (sulfides) formed according to Markownikoff's rule, wherein the sulfhydryl group, —SH, of the hydrogen sulfide becomes attached to the unsaturated carbon atom of the ethylenically unsaturated compound having the lesser number of hydrogen atoms.

The above-described reaction of hydrogen sulfide with the ethylenically unsaturated compound can be carried out in the presence of solvents or diluents such as water, low molecular weight alcohols, such as methanol, ethanol, n-propanol, isopropanol, n-buatnol, and the like, ethers such as diethyl ether and dioxane, ketones such as acetone, esters such as methyl acetate, and other solvents such as petroleum naphtha, toluene, and the like.

Such solvents or diluents are especially useful where $R_3$ of Formula 1 is hydrogen or an alkyl group. In most cases, where $R_3$ of Formula 1 is a hydroxy group or an alkoxy group, such solvents will usually be unnecessary.

The utility of sulfur compounds, such as those prepared according to this invention, is well known, and their uses representatively include pesticides, dyestuff intermediates, pharmaceuticals (such as anti-radiation drugs), inhibitors for enzymatic deterioration of plants, and rubber polymerization chemicals, such as polymerization modifiers.

The following examples further illustrate the objects and advantages of this invention, but it should be understood that the various reactants, amounts, temperatures, pressures, and other conditions recited in these examples should not be construed so as to limit unduly this invention.

EXAMPLE I

In this example, a run was carried out in which 1-amino-2-propanethiol was prepared in the absence of sulfur. In this run, 684 g. of allylamine and 816 g. of hydrogen sulfide were heated together for 5 hrs. at 85° C. in a stainless steel, stirred autoclave. The reaction solution was discharged without cooling to obtain 1100 g. of reaction solution, the latter then being diluted with 1100 g. of mixed xylenes to obtain two liquid phases. The two-phase mixture was distilled in a Vigreux column at aspirator pressure (about 50 mm. Hg absolute) until about 500 ml. of clear viscous liquid came overhead and the kettle material became a single phase. The overhead was heated at atmospheric pressure to 75° C. and distilled and the remaining amount of kettle material was returned to the kettle of the original distillation column. The pressure on the latter was adjusted to 80 mm. Hg absolute, and the distillation of the combined kettle products was continued until crystals began to form in the condenser. An additional 1,000 g. of mixed xylenes were added to the resulting material in the kettle and the resulting mixture was distilled again at 80 mm. Hg absolute. The total overhead from the distillation at 80 mm. Hg absolute amounted to 2328 g. and the total kettle product from such distillation amounted to 37.7 g. This latter overhead was cooled to $-30°$ C. to crystallize the 1-amino-2-propanethiol. The material was filtered under nitrogen and the crystal cake was washed with n-pentane. This cake was then dried in a slow stream of nitrogen, yielding 254 g. of 1-amino-2-propanethiol, which represents only 23.3 mole percent yield based on the allylamine initially charged to the reactor.

The above-described run was repeated to yield only 23.6 mole percent of 1-amino-2-propanethiol, based on the allylamine charged.

The above-described procedure was repeated in another run, except that said reaction was carried out in the presence of 12 g. of sulfur, according to this invention. As a result, 701.3 g. of crystallized 1-amino-2-propanethiol was obtained, which represents a yield of 64.3 mole percent based on the allylamine charged. As compared to the runs described above, wherein the reaction was carried out in the absence of sulfur, said yield of 64.3 mole percent is 2.75 times as large as the yield obtained by carrying out the reaction in the absence of sulfur.

EXAMPLE II

In this example, a series of runs was carried out in which, in each run, hydrogen sulfide was reacted with allyl alcohol in the presence or absence of certain materials, the mole ratio of hydrogen sulfide to the alcohol being 2/1. At the end of each reaction, the product was recovered by distillation in the manner like that described in Example I, except that no mixed xylenes were used as diluents. These runs and the results obtained are set forth in Table I.

*Table I*

| | Basic material used | | Amt. of sulfur used, g./mole [a] | Yield of sulfur products, mole percent [f] | | |
|---|---|---|---|---|---|---|
| Run | Name | Amt., g./mole [a] | | Mercaptan [b] | Sulfide [c] | Total |
| 1 | None | 0 | 0 | 1.4 | 8.9 | 10.3 |
| 2 | do | 0 | 1.0 | 0 | 30.6 | 30.6 |
| 3 | Trimethylamine | 2.0 | 0 | 13.6 | 20.4 | 34.0 |
| 4 | Triethylamine | 2.0 | 1.0 | 19.8 | 55.3 | 75.1 |
| 5 | Diethylamine | 2.0 | 1.0 | 27.2 | 50.3 | 77.7 |
| 6 | Ethylamine | 2.0 | 1.0 | 32.5 | 41.5 | 74.0 |
| 7 | Sodium hydroxide | 2.0 | 1.0 | 29.9 | 44.8 | 74.7 |
| 8 | Ammonia | 2.0 | 1.0 | 22.3 | 58.5 | 80.7 |
| 9 | do | 10.0 | 1.0 | 36.2 | 40.3 | 76.5 |
| 10 | do | 2 | 0.2 | 17.0 | 42.0 | 59.0 |
| 11 | do | 2 | 5 | 13.8 | [d] 72.5 | 86.3 |
| 12 [e] | Pyridine | 2.0 | 1.0 | 2.2 | 30.6 | 32.6 |
| 13 [e] | Aniline | 2.0 | 1.0 | 0 | 29.6 | 29.6 |

[a] Amt. given on basis of grams per mole of unsaturated reactant.
[b] Mercaptan formed was 1-methyl-2-hydroxyethyl mercaptan.
[c] Sulfide formed was bis(1-methyl-2-hydroxyethyl)sulfide.
[d] This percent is the sum of 61.3% of bis(1-methyl-2-hydroxyethyl)sulfide and 11.2% of bis(1-methyl-2-hydroxyethyl)disulfide, indicating that, because of large amt. of sulfur used, the sulfur acted as a reactant.
[e] The results obtained for these runs indicate that pyridine and aniline are not effective as basic catalysts.
[f] Based on unsaturated reactant.

The data of Table I show that significant increase in yield of organic sulfur compounds can be obtained by carrying out the reaction in the presence of a catalytic amount of sulfur and certain basic compounds.

EXAMPLE III

A run was carried out in which hydrogen sulfide was reacted with octene-1 in the presence of a solvent and catalytic amounts of sulfur and a basic material.

In this run, a reactor like that used in the preceding examples was charged with 544 grams of hydrogen sulfide, 896 grams of n-propanol, 896 grams octene-1, 16 grams of triethylamine, and 8 grams of sulfur. The reactor and its contents were heated to 85° C. and maintained at this temperature for 5 hours. At the end of this time, the reactor was cooled and the reaction mixture was worked up in the same manner as that described in the previous examples. This run yielded 5.6 mole percent of secondary octyl mercaptan and 24.2 mole percent of di-sec-octyl sulfide. In a similar run, carried out in the absence of the catalyst system of this invention, very little mercaptan and sulfide were obtained from the reaction of hydrogen sulfide and octene-1 at 85° C. for 5 hours.

Various modifications and alterations of this invention will become apparent to those skilled in the art from the foregoing description without departing from the scope and spirit of this invention, and it should be understood that this invention is not to be limited unduly to that set forth herein for illustrative purposes.

I claim:
1. A process for preparing mercaptans and thio-ether compounds, which process comprises reacting monoolefinic compounds with hydrogen sulfide in a reaction zone in the presence of a basic material present in the amount of 0.25 to 30 grams per mol of said monoolefinic compound and an amount of sulfur in the range of 0.2 to 5 grams per mol of said monoolefinic compound charged to said reaction zone, said monoolefinic compounds having the formula:

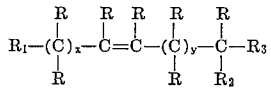

where:
$x$ and $y$ are integers from 0 to 5,
R is selected from the group consisting of hydrogen and alkyl radicals having 1 to 5 carbon atoms,
$R_1$ and $R_2$ are selected from the group consisting of hydrogen and alkyl radicals having 1 to 5 carbon atoms, and together can form a covalent bond with the proviso that when they form said covalent bond that the sum of $x$ and $y$ is at least 2, and
$R_3$ is selected from the group consisting of hydrogen, alkyl radical having 1 to 5 carbon atoms, $N(R)_2$ and OR radicals, with the proviso that where $R_3$ is $N(R)_2$, said organic compound containing ethylenic unsaturation can serve as said basic material, and where said basic material is selected from the group consisting of alkali metal hydroxides and compounds having the general formula:

where $R_4$ is selected from the group consisting of hydrogen and alkyl radicals having 1 to 8 carbon atoms, and recovering said organic sulfur compounds from the resulting reaction mixture.

2. The process according to claim 1, wherein said monoolefinic compound is allylamine.

3. The process according to claim 1, wherein said monoolefinic compound is allyl alcohol and said basic material is ammonia.

4. The process according to claim 1, wherein said monoolefinic compound is octene-1.

5. The process according to claim 1 wherein said basic material is an alkali metal hydroxide.

6. The process according to claim 1 wherein said basic material is said compound having said formula $N(R_4)_3$.

References Cited by the Examiner

UNITED STATES PATENTS 2,061,019  11/1936  Carter et al.
2,137,584  11/1938  Ott _____ 260—399

OTHER REFERENCES

Ephraim: Inorganic Chemistry (4th edition) (1943), Interscience Publishers, New York, N.Y., page 524.

Jones et al.: Jour. Am. Chem. Soc., volume 60, pages 2452 to 2455 (1938).

Mellor: "Comprehensive Treatise of Inorganic and Theoretical Chemistry," volume 2, pages 508 and 645 (1922), Longmans, Green and Co., New York, N.Y.

Richter: "Textbook of Organic Chemistry" (1938 edition), pages 241–242, John Wiley and Sons, New York, N.Y.

CHARLES B. PARKER, *Primary Examiner.*

DANIEL D. HORWITZ, JOSEPH P. BRUST,
*Examiners.*